(12) United States Patent  
Negishi et al.

(10) Patent No.: US 12,233,466 B2  
(45) Date of Patent: *Feb. 25, 2025

(54) CERMET INSERT AND CUTTING TOOL PROVIDED WITH CERMET INSERT

(71) Applicant: KYOCERA CORPORATION, Kyoto (JP)

(72) Inventors: Ayano Negishi, Otsu (JP); Ryoma Nomiyama, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/248,872

(22) PCT Filed: Oct. 18, 2021

(86) PCT No.: PCT/JP2021/038497  
§ 371 (c)(1),  
(2) Date: Apr. 13, 2023

(87) PCT Pub. No.: WO2022/085649  
PCT Pub. Date: Apr. 28, 2022

(65) Prior Publication Data  
US 2023/0398609 A1    Dec. 14, 2023

(30) Foreign Application Priority Data  
Oct. 21, 2020 (JP) ................................. 2020-177012

(51) Int. Cl.  
*B23B 27/16* (2006.01)

(52) U.S. Cl.  
CPC .... *B23B 27/1607* (2013.01); *B23B 2200/326* (2013.01)

(58) Field of Classification Search  
None  
See application file for complete search history.

(56) References Cited

U.S. PATENT DOCUMENTS 5,643,658 A * 7/1997 Uchino ................. C23C 30/005  
428/467  
8,415,033 B2 * 4/2013 Matsuzawa ............. B23B 51/00  
51/307

(Continued)

FOREIGN PATENT DOCUMENTS

EP          0569696 A2    11/1993  
JP       2011218481 A    11/2011  
(Continued)

*Primary Examiner* — Seth Dumbris  
(74) *Attorney, Agent, or Firm* — HAUPTMAN HAM, LLP (57) ABSTRACT

A cermet insert includes a first surface, a second surface, a cutting edge, a third surface located opposite to the first surface, and a through hole extending from the first surface to the third surface. An inner wall constituting the through hole has, at least in a center portion, a binder-phase-rich layer having a higher binder phase content than an interior of the base. A thickness T1 of the binder-phase-rich layer at the center portion is larger than a thickness T2 of the binder-phase-rich layer at an end portion. The thickness T1 is 1 μm or more and 20 μm or less, the thickness T2 is 0.2 μm or more and 6 μm or less. The first surface includes a chip breaker. An arithmetic mean roughness Ra of the chip breaker is 0.05 μm or less when a cut-off value is 0.08 mm.

9 Claims, 8 Drawing Sheets

(56) References Cited

U.S. PATENT DOCUMENTS

2006/0171837 A1    8/2006   Heinrich et al.
2022/0176463 A1    6/2022   Tanaka et al.

FOREIGN PATENT DOCUMENTS

JP      2012245581 A    12/2012
JP        5334486 B2 *   11/2013

* cited by examiner

CERMET INSERT AND CUTTING TOOL PROVIDED WITH CERMET INSERT

CROSS-REFERENCE TO RELATED APPLICATIONS

This application is national stage application of International Application No. PCT/JP2021/038497, filed on Oct. 18, 2021, which designates the United States, and which claims the benefit of priority from Japanese Patent Application No. 2020-177012, filed on Oct. 21, 2020.

TECHNICAL FIELD

The present disclosure relates to a cermet insert used in machining and a cutting tool including the cermet insert.

BACKGROUND OF INVENTION

Cermets containing titanium (Ti) as a main constituent have been widely used as a base of a member requiring wear resistance, slidability, and chipping resistance for a cutting tool, a wear resistant member, a sliding member, and the like.

For example, Patent Document 1 describes a surface-coated titanium carbonitride-based cermet cutting insert having a through hole for attachment to a tool body. Patent Document 1 describes that a metal stain-proofing layer is provided on an inner surface of the through hole for attachment in order to provide an insert with less abnormal damage even in high-load cutting.

CITATION LIST

Patent Literature

Patent Document 1: JP 2012-245581 A

SUMMARY

The insert of the present disclosure is a cermet insert including a base which is a cermet including a hard particle and a binder phase. A cermet insert of the present disclosure includes a first surface, a second surface, a cutting edge located on at least a part of a ridge line between the first surface and the second surface, a third surface located opposite to the first surface, and a through hole extending from the first surface to the third surface. An inner wall constituting the through hole has, at least in a center portion, a binder-phase-rich layer having a higher binder phase content than an interior of the base. A thickness T1 of the binder-phase-rich layer at the center portion is larger than a thickness T2 of the binder-phase-rich layer at an end portion of an inner wall. The thickness T1 is 1 µm or more and 20 µm or less, the thickness T2 is 0.2 µm or more and 6 µm or less. The first surface includes a chip breaker. An arithmetic mean roughness Ra of the chip breaker is 0.05 µm or less when the cut-off value is 0.08 mm.

DESCRIPTION OF EMBODIMENTS

Insert Hereinafter, a cermet insert (hereinafter, simply referred to as an "insert") of the present disclosure and a cutting tool including the same will be described in detail with reference to the drawings. However, each of the figures, which will be referred to below, is a simplified representation of only main members necessary for description of the embodiments. Thus, the insert according to the present disclosure may include any constituent member not illustrated in each of the figures referred to. The dimensions of the members in the drawings do not faithfully represent the actual dimensions of the component members, the dimensional proportions of the members, or the like. The above-described points are similarly applied to a cutting tool described later.

In a cermet insert used in machining, it is desirable to minimize abnormal damage. The present disclosure provides a cermet insert with less abnormal damage and a cutting tool including the cermet insert.

The insert of the present disclosure has a base which is a cermet containing hard particles and a binder phase. Each of the plurality of hard particles is, for example, TiCN, TiC, TiN, or (TiM)CN, where M is one or more selected from the group consisting of W, Nb, Ta, Mo, and V. The binder phase contains an iron group metal such as Ni or Co as a main constituent. Note that the main constituent includes 50 mass % or more of component constituents.

Figure 1:
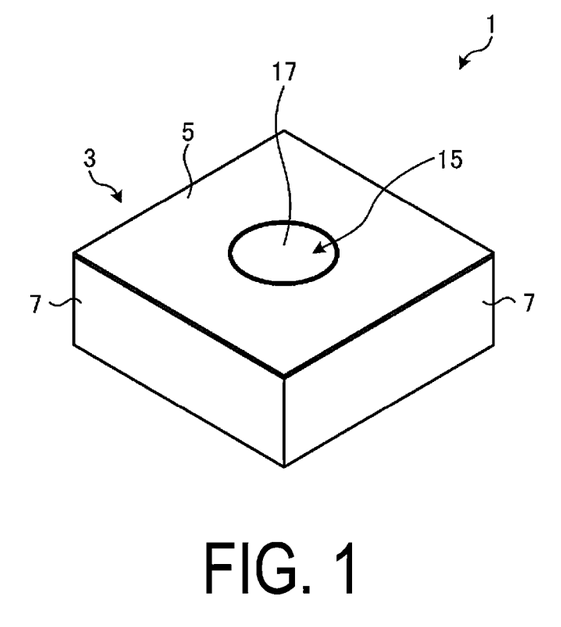
FIG. 1 is a perspective view illustrating an example of an insert according to a present disclosure.
Figure 2:
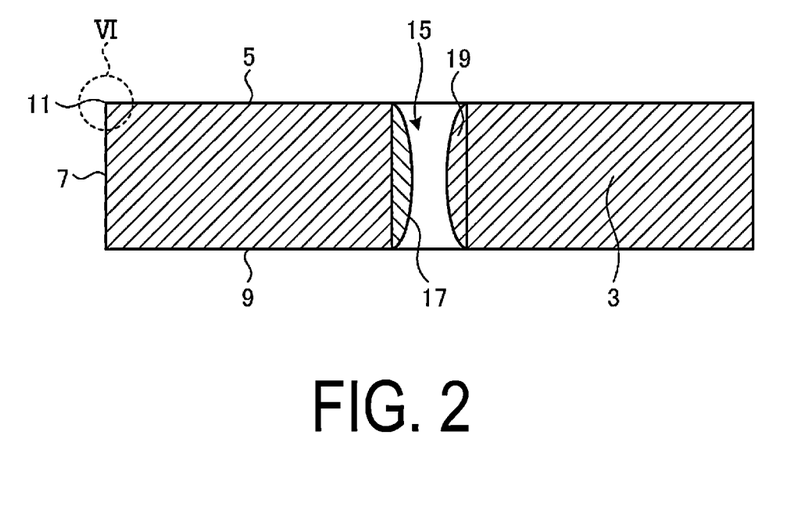
FIG. 2 is a schematic cross-sectional view illustrating an example of the insert of the present disclosure.

As illustrated in FIGS. 1 and 2, an insert 1 according to the present disclosure may have a quadrilateral plate shape. A first surface 5, which is an upper surface in FIG. 1, is a so-called rake face. The insert 1 includes a second surface 7, which is a side surface connected to the first surface 5.

The insert 1 includes a third surface 9, which is a lower surface located opposite the first surface 5. The second surface 7 is connected to each of the first surface 5 and the third surface 9.

The insert 1 according to the present disclosure includes a cutting edge 11 located on at least a part of a ridge line where the first surface 5 and the second surface 7 intersect. In other words, the insert 1 of the present disclosure includes the cutting edge 11 located on at least part of the ridge line where the rake face and the flank face intersect. The cutting edge 11 may have a fourth surface continuous with the first surface 5 and the second surface 7. The fourth surface may be a C surface (chamfer surface) obtained by obliquely and linearly cutting a corner portion between the first surface 5 and the second surface 7. The fourth surface may be an R surface (round surface) obtained by rounding a corner portion between the first surface 5 and the second surface 7.

In the insert 1, the entire outer periphery of the first surface 5 may be the cutting edge 11, but the insert 1 is not limited to such a configuration. For example, the insert 1 may have the cutting edge 11 only on one side of a quadrangular rake face, in other words, on one of four fourth surfaces.

Figure 3:
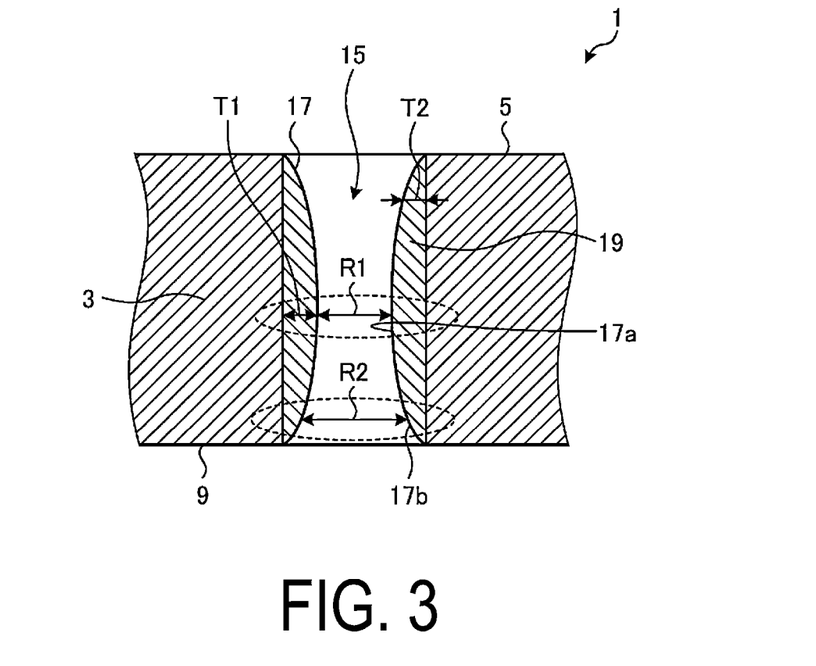
FIG. 3 is an enlarged schematic view of a cross section of the insert of the present disclosure.

The insert 1 of the present disclosure includes a through hole 15 penetrating through a base 3 from the first surface 5 to the third surface 9. As illustrated in FIG. 3, a binder-phase-rich layer 19 is present at least in a center portion 17a of an inner wall 17 of the through hole 15. The binder-phase-rich layer 19 is a region containing hard particles and a binder phase, and having a higher binder phase content than the interior of the base 3. The interior of the base 3 means a portion separated from the surface of the base 3 by 500 μm or more. The binder-phase-rich layer 19 does not need to be present over the entirety of the inner wall 17 of the through hole 15, and may be located at least on the center portion 17a.

The center portion 17a is a center when the through hole 15 is equally divided into nine in a depth direction. An end portion 17b is an end when the through hole 15 is equally divided into nine in the depth direction.

As illustrated in FIG. 3, in the insert 1 of the present disclosure, the thickness T1 of the binder-phase-rich layer 19 at the center portion 17a of the inner wall 17 constituting the through hole 15 is larger than the thickness T2 of the binder-phase-rich layer 19 at the end portion 17b of the inner wall 17 constituting the through hole 15. The thickness T1 of the binder-phase-rich layer 19 at the center portion 17a and the thickness T2 of the binder-phase-rich layer 19 at the end portion 17b are average values, respectively. The thicknesses T1 and T2 are measured by observing a cross section of the insert 1 using a metallurgical microscope or an electron microscope. The binder-phase-rich layer 19 need not be present in the end portion 17b.

Since the insert 1 of the present disclosure has such a configuration, abnormal damage to the insert 1, which starts from the inner wall 17 to which a large force is applied when the insert 1 is fixed to the holder (not illustrated), is suppressed.

The binder-phase-rich layer 19 has a hardness lower than that of the base 3 and higher than that of a metal stain-proofing layer as described in Patent Document 1. Therefore, the deformation of the binder-phase-rich layer 19 is more suppressed than that of the metal stain-proofing layer.

With the above-described configuration, when the insert 1 is fixed to a holder by a clamp, local force applied to the base 3 is small due to the suppressed deformation of the binder-phase-rich layer 19 at the center portion 17a at the contact between the center portion 17a in the inner wall 17 and the clamp, whereby the insert 1 is less likely to crack and be abnormally damaged.

The size of the insert 1 is not particularly limited but, for example, the length of one side of the rake face is set to about from 3 mm to 20 mm. The thickness of the insert 1 is set to, for example, about from 1 mm to 20 mm. In FIG. 1, the insert 1 having the quadrangular shape is exemplified, but the insert 1 may have a triangular shape or a disk shape, for example.

Figure 4:
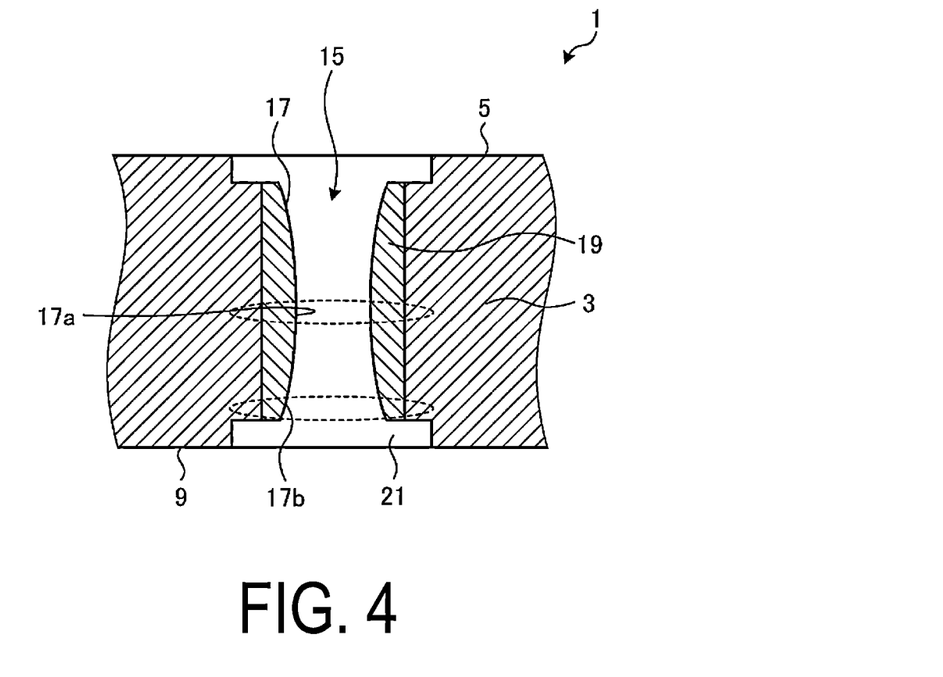
FIG. 4 is an enlarged schematic view of a cross section of another embodiment of the insert of the present disclosure.

As illustrated in FIG. 4, the insert 1 of the present disclosure may have an enlarged-diameter portion 21 connected to the inner wall 17. There is a step at a boundary between the through hole 15 and the enlarged-diameter portion 21. In the example illustrated in FIG. 4, the binder-phase-rich layer 19 is not present on the inner wall of the enlarged-diameter portion 21, but the binder-phase-rich layer 19 may be present in the enlarged-diameter portion 21. In the insert 1 of the present disclosure, the enlarged-diameter portion 21 is not included in the through hole 15. The enlarged-diameter portion 21 is a so-called counter-bored surface. The diameter of the enlarged-diameter portion 21 is larger than the diameter of the through hole 15 by 300 μm or more.

The thickness T1 of the binder-phase-rich layer 19 at the center portion 17a may be 1 μm or more. The thickness T1 may be 20 μm or less. Such a configuration suppresses abnormal damage to the insert 1. The thickness T1 may be 3 μm or more. The thickness T1 may be 10 μm or less.

The thickness T2 of the binder-phase-rich layer 19 at the end portion 17b may be 0.2 μm or more. The thickness T2 may be 6 μm or less. Such a configuration suppresses abnormal damage to the insert 1. The thickness T2 may be 0.6 μm or more. The thickness T2 may be 4 μm or less. According to such a configuration, since the local force applied to the base 3 is further reduced, the insert 1 is less likely to be broken and abnormal damage is further suppressed.

Figure 5:
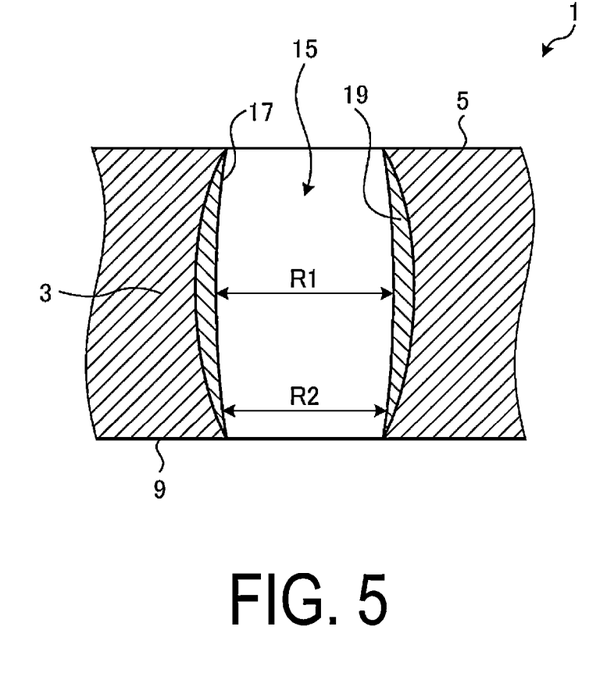
FIG. 5 is an enlarged schematic view of a cross section of another embodiment of the insert of the present disclosure.

As illustrated in FIG. 5, a diameter R1 at the center portion 17a may be larger than a diameter R2 at the end portion 17b. With such a configuration, the contact area between the clamp and the inner wall 17 is increased, and the clamping force is increased.

The diameter R1 of the center portion 17a may be larger than the diameter R2 of the end portion 17b by 5 μm or more and 30 μm or less. Such a configuration suppresses abnormal damage to the insert 1.

The hardness of the binder-phase-rich layer 19 at the center portion 17a may be 10 GPa or more and 20 GPa or less. According to such a configuration, when the clamp pin comes into contact with the binder-phase-rich phase 19, the binder-phase-rich phase 19 is appropriately deformed, and the clamping force is increased. The hardness of the binder-phase-rich layer 19 at the center portion 17a is measured by measuring the binder-phase-rich layer 19 that is exposed in the cross section of the insert 1 using a nanoindentation method.

The binder-phase-rich layer 19 at the center portion 17a may have a metal layer (not illustrated) having a higher binder phase content than the binder-phase-rich layer 19 on the through-axis side of the through hole 15. The metal layer does not include a hard layer and is made of only a metal. With such a configuration, the metal layer functions as a buffer material between a clamp to be described below and the binder-phase-rich layer 19, thus suppressing abnormal damage to the insert 1. The metal layer may have a thickness of 0.3 μm or more and 2 μm or less.

The insert 1 may have a coating layer (not illustrated) on the binder-phase-rich layer 19 in the center portion 17a. The coating layer is, for example, a hard layer containing TiCN, TiN, TiCNO, $Al_2O_3$, or the like. The coating layer has a portion having a higher hardness than the binder-phase-rich layer 19. With such a configuration, the wear resistance of the clamp portion is increased. The coating layer may be a single layer or a laminate. The coating layer may be formed by a CVD method or a PVD method.

Figure 6:
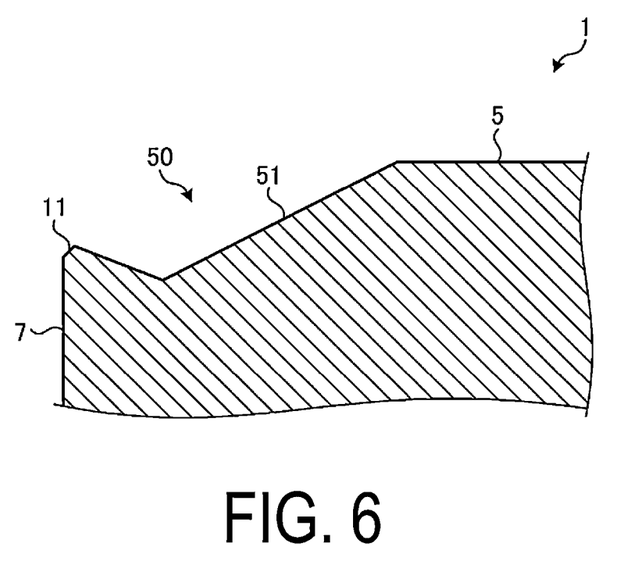
FIG. 6 is a schematic enlarged view of a VI portion illustrated in FIG. 2.

FIG. 6 is a schematic enlarged view of a VI portion illustrated in FIG. 2. As illustrated in FIG. 6, the insert 1 has a chip breaker 50 on the first surface 5 which is a rake face. As an example, the chip breaker 50 is a recessed portion formed by recessing the first surface 5. The chip breaker 50 has an inclined surface (barrier 51) inclined downward from the first surface 5 toward the cutting edge 11.

The chip breaker 50 curls the chip of the work material at the barrier 51, thereby suitably breaking the chip and discharging the chip in a desired direction. The insert 1 having such a chip breaker 50 can suppress biting, rolling, and the like of the chip. As a result, abnormal damage to the insert 1 caused by, for example, rolled chips hitting the base 3 is reduced. The chip breaker 50 is not limited to the illustrated shape as long as it has at least the barrier 51. For example, the chip breaker 50 does not necessarily have to be a recessed portion, and may have a stepped shape.

The chip breaker 50 may have an arithmetic mean roughness Ra of 0.05 μm or less when the cut-off value is 0.08 mm. When the surface roughness of the chip breaker 50 is large (in other words, the friction coefficient is large), depending on the type of work material, the work material and the chip may be welded to the chip breaker 50. Examples of the work material that is likely to be welded include chromium molybdenum steel (SCM) and SCr420. When such welding occurs, a local force is applied to the insert 1 by the welded work material or chip, and the insert 1 may be broken. On the other hand, by setting the surface roughness of the chip breaker 50 in the above range, welding of the work material and the chip to the chip breaker 50 can be suppressed. As a result, sudden fracture of or abnormal damage to the insert 1 is suppressed, and chipping resistance is improved. In other words, the cutting time until chipping occurs is extended.

The surface roughness of the cutting edge 11, in other words, the surface roughness of the fourth surface where the cutting edge 11 is located may have an arithmetic mean roughness Ra of 0.1 μm or less when the cut-off value is 0.08 mm. The insert 1 receives a large resistance when coming into contact with (biting into) a work material. This resistance at the time of biting can be a cause of chipping of the insert 1. On the other hand, by setting the surface roughness of the cutting edge 11, which is a portion that first comes into contact with the work material, within the above range, the resistance at the time of biting can be reduced. This makes it possible to further suppress chipping of the insert 1, specifically, sudden chipping occurring at the time of biting into a work material. The cutting time until chipping occurs in the insert 1 is extended, and chipping resistance is improved.

The cutting edge 11 (fourth surface) may have an arithmetic mean roughness Ra of 0.04 μm or less when the cut-off value is 0.08 mm. In this case, as the cutting edge 11 (fourth surface), a glossy and excellent finished surface is obtained.

In the present embodiment, in order to measure the arithmetic mean roughness Ra of the chip breaker 50 and the arithmetic mean roughness Ra of the cutting edge 11, the surface shapes of the chip breaker 50 and the cutting edge 11 may be measured in accordance with the JISB0601-2013 standard except that the cut-off value is fixed at 0.08 mm. For the measurement, for example, a contact-type surface roughness measuring instrument using a stylus or a non-contact-type surface roughness measuring instrument using a laser is used. When the arithmetic mean roughness Ra of the cutting edge 11 is measured, the surface shape in the direction along the cutting edge 11 is measured. When the first surface 5 is circular and the cutting edge 11 is arc-shaped, the surface shape is measured on a curve along the cutting edge 11.

Method for Manufacturing Insert

An example of a method for manufacturing the insert of the present disclosure will be described below.

A raw material powder used for manufacturing the insert of the present disclosure is generally used for manufacturing a cermet. The insert of the present disclosure can be obtained by devising the composition and firing conditions of the base and the processing method for the base.

The base may contain, for example, 40 mass % or more and 80 mass % or less of TiCN as hard particles, and 6 mass % or more and 30 mass % or less of Co as a binder phase. In order to further improve properties, the base may contain WC, TaC, NbC, $Mo_2C$, VC, ZrC, or the like.

The raw material having the above-described composition is molded into a shape having a space to be a through hole after firing. Thereafter, for example, firing is performed at a temperature of 1400° C. or more and 1600° C. or less. The firing atmosphere may be a $N_2$ partial pressure atmosphere.

When the $N_2$ partial pressure is 1 kPa or more, the binder-phase-rich layer becomes thick after sintering. When an average particle size d50 of the hard particles used as a material is 0.7 μm or less, a binder-phase-rich layer having a metal layer containing a larger amount of binder phase than the binder-phase-rich layer can be obtained on the side of the through-axis (not illustrated) of the through hole.

When the forming pressure is high at the time of molding, deformation at the time of firing can be suppressed. On the other hand, when the forming pressure is reduced at the time of forming, the diameter R1 at the center portion of the inner wall tends to be larger than the diameter R2 at the end portion. The relationship between the forming pressure and the deformation varies depending on the composition and the firing temperature, and thus is adjusted in various combinations.

For example, a rotating brush is inserted into the through hole from both end portions of the through hole after sintering, and the inner wall of the through hole is polished so that the binder-phase-rich layer has the thickness T1 at the center portion which is larger than the thickness T2 of the binder-phase-rich layer at the end portions, whereby, the insert of the present disclosure can be obtained. The brush may be inserted from both sides of the through hole, or may be inserted from one side in two steps.

Thereafter, a coating layer (not illustrated) may be provided if necessary. The coating layer is a so-called hard film, and may be formed by, for example, a PVD method or a CVD method. The coating film may be a single layer or a laminated film.

As the coating film, for example, a known material such as TiN, TiCN, TiCNO, $Al_2O_3$, or TiAlN can be used. A coating film made of a material other than the above examples may be used.

A binder-phase-rich layer may be present in a region other than the through hole, for example, the first surface, the second surface, and the third surface at a time after firing, but the binder-phase-rich layer may be removed if necessary.

The surface roughness of the chip breaker can be adjusted by, for example, blasting the surface of the base. Specifically, the blasting is a machining method in which a mixture (slurry) obtained by mixing a solution mixed with ceramic abrasive grains and compressed air is caused to collide with the surface of the base. Examples of the ceramic abrasive grains include alumina. The ceramic abrasive grains may have an average particle diameter of 10 μm or less. When the average particle diameter of the ceramic abrasive grains exceeds 10 μm, the surface of the base becomes rough, and the surface roughness may be outside the above-mentioned range.

The surface roughness of the cutting edge can be adjusted by polishing only the cutting edge with a polishing method such as one using a brush, an elastic grindstone, or blasting. As a polishing method, brush polishing may be performed. At this time, a polishing liquid in which a flexible brush such as a hog hair brush, fine diamond powder having an average particle diameter of 4 μm or less, preferably 0.5 μm or more and 2.5 μm or less, and a lubricant are mixed may be used. Brush polishing is performed using a polishing liquid in which fine diamond powder having an average particle diameter of 0.5 μm or more and 2.5 μm or less and a lubricant are mixed so that the amount of protrusion of brush bristles in brush polishing is 0.5 cm or more and 5 cm or less. At this time, the insert is set in a case having a recess of the same shape as the shape of the insert and machined. At this time, the height of the cutting edge and the upper surface of the case are set to the same height, and the clearance between the case and the outer periphery of the insert is set to 0.5 mm or less. Alternatively, the leading end of the brush bristles may be set at the same height as the upper surface of the case, and polishing may be performed.

Thus, only the chip breaker can be polished. Therefore, the surface roughness of the chip breaker can be adjusted to a desired range while keeping the surface roughness of the cutting edge in a desired range. The surface roughness of the chip breaker may be adjusted by masking the cutting edge and applying a polishing method such as one using a brush, an elastic grindstone, or blasting to the portion forming the chip breaker.

Next, only the cutting edge is polished by a polishing method such as one using a brush, an elastic grindstone, or blasting, thereby adjusting the surface roughness of the cutting edge. As a polishing method, brush polishing may be performed. At this time, the amount of protrusion of the brush bristles in the brush polishing may be set to 0.5 cm or more and 5 cm or less, preferably 2.5 cm or more and 3.5 cm or less, and a polishing liquid in which fine diamond powder having an average particle diameter of 4 μm or less, preferably 0.5 μm or more and 2.5 μm or less and a lubricant are mixed may be used. This makes it possible to adjust the surface roughness of the cutting edge within a desired range while keeping the surface roughness of the chip breaker within a desired range. The surface roughness of the cutting edge may be adjusted by masking the chip breaker and applying a polishing method such as one using a brush, an elastic grindstone, or blasting to the portion forming the cutting edge. The surface roughness of the cutting edge may be adjusted by masking the chip breaker and applying a polishing method such as one using a brush, an elastic grindstone, or blasting to the portion forming the cutting edge.

Cutting Tool

The cutting tool according to the present disclosure will be described with reference to the drawings.

Figure 7:
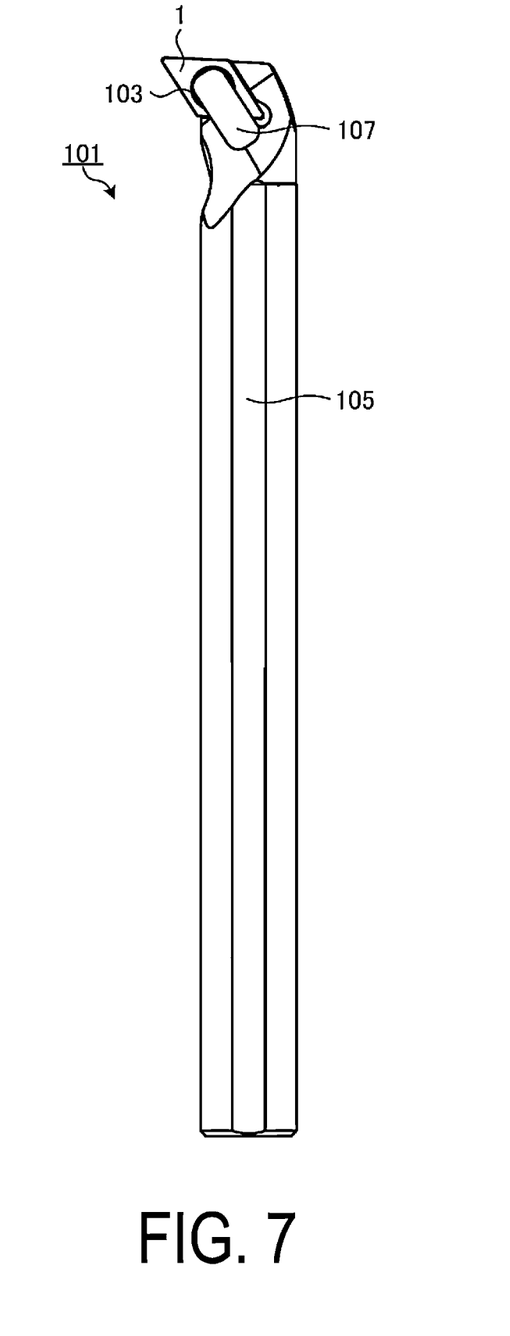
FIG. 7 is a plan view illustrating an example of a cutting tool of the present disclosure.

As illustrated in FIG. 7, a cutting tool 101 according to the present disclosure is, for example, a rod shape body extending from a first end (an upper end in FIG. 7) to a second end (a lower end in FIG. 7). As illustrated in FIG. 7, the cutting tool 101 is provided with a holder 105 and the insert 1 described above. The holder 105 includes a pocket 103 on a first end side (leading end side) thereof. The insert 1 is located on the pocket 103.

Figure 8:
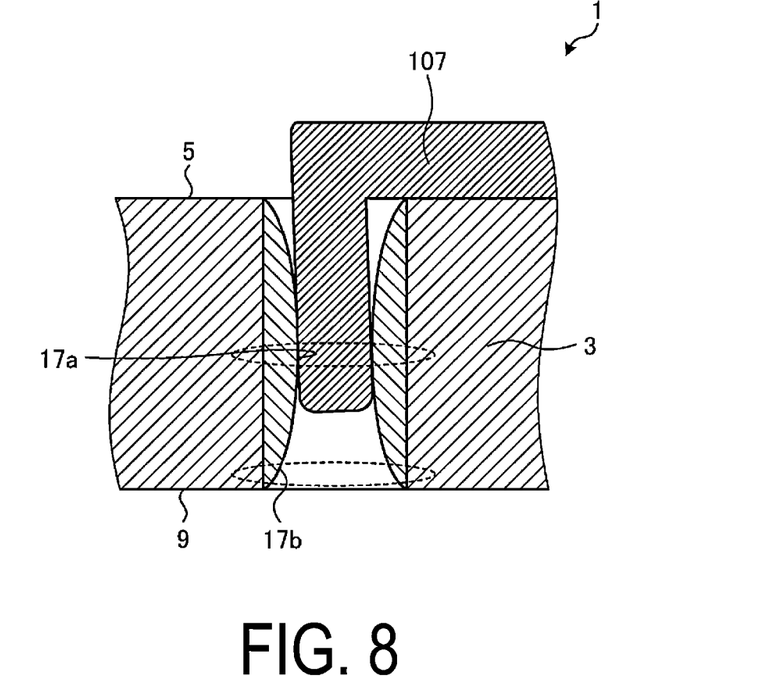
FIG. 8 is an enlarged schematic view of a cross section of the insert in the cutting tool of the present disclosure.

As illustrated in FIG. 8, a clamp 107 is inserted into the through hole 15 (see FIG. 1) of the insert 1. In the example illustrated in FIG. 8, the clamp 107 is in direct or indirect contact with the binder-phase-rich layer 19 (see FIG. 2) located at the center portion 17a. The indirect contact between the clamp 107 and the binder-phase-rich layer 19 means a state in which a metal layer or a coating layer is present between the binder-phase-rich layer 19 and the clamp 107. Since the binder-phase-rich layer 19 with which the clamp 107 is in contact is more easily deformed than the base 3, a locally strong force is less likely to be applied to the insert 1. When the binder-phase-rich layer 19 is provided, the contact area between the clamp 107 and the binder-phase-rich layer 19 is large, and thus the insert 1 is less likely to move in the pocket during cutting. In combination with such effects, the insert 1 of the present disclosure is less likely to be abnormally damaged. Since the cutting tool 101 includes the insert 1, stable machining can be performed for a long period of time.

The pocket 103 is a portion in which the insert 1 is mounted and includes a seating face, which is parallel to a lower surface of the holder 105, and a binding side face, which is inclined with respect to the seating face. The pocket 103 is open on the first end side of the holder 105.

The insert 1 is positioned in the pocket 103. At this time, the lower surface of the insert 1 may directly contact the pocket 103, and a sheet (not illustrated) may be sandwiched between the insert 1 and the pocket 103.

The insert 1 is mounted on the holder 105 in such manner that at least a part of a portion used as the cutting edge 11 on the ridge line where the rake face and the flank face intersect, protrudes outward from the holder 105. In the present embodiment, the insert 1 is mounted on the holder 105 using a fixing screw 107. That is, the insert 1 is mounted on the holder 105 by inserting the fixing screw 107 into a through hole (15) of the insert 1, inserting a leading end of the fixing screw 107 into a screw hole (not illustrated) defined in the pocket 103, and screwing threaded portions thereof together.

As a material of the holder 105, steel or cast iron can be used. Steel with high toughness may be used among these members.

In the present embodiment, a cutting tool 101 used in so-called turning processing is exemplified. Examples of the turning processing include boring, outer diameter processing, groove-forming, and end surface processing. Note that, the cutting tool 101 is not limited to those used in the turning processing. For example, the insert 1 according to the above-described embodiment may be used as the cutting tool 101 used in milling processing.

Example

The insert according to the present disclosure will be described below.

The base was prepared as follows. After a binder was added to the raw material powder containing 40 mass % of TiCN, 12 mass % of TiN, 20 mass % of WC, 8 mass % of NbC, 20 mass % of Co, the raw material powder was shaped into a desired shape by press molding, and thus a compact having a tool shape with a through hole was produced. These raw material powders are generally used in the production of a cermet. The composition of the base of the present disclosure is also not particular. Thereafter, the binder constituent was removed, and then the base was fired in a nitrogen gas atmosphere of 3 kPa at a temperature of 1530° C. for one hour, thereby obtaining an insert including a binder-phase-rich layer having a metal layer on the inner wall of the through hole.

Thereafter, the inner wall of the through hole was polished with a brush to produce an insert having a configuration shown in Table 1. A portion where the binder-phase-rich layer is not present or the thickness of the binder-phase-rich layer is small is obtained by increasing the polishing time with the brush.

TABLE 1

| Sample No. | | Presence or absence of binder-phase-rich layer | Presence or absence of metal layer | Thickness (μm) of binder-phase-rich layer | | Surface roughness Ra (μm) of chip breaker | Surface roughness Ra (μm) of cutting edge | Cutting time (min) until chipping occurs |
|---|---|---|---|---|---|---|---|---|
| | | | | T1 | T2 | | | |
| Comparative Example | 1 | Absent | Absent | — | — | 0.05 | 0.12 | 40 |
| Comparative Example | 2 | Present | Absent | 0.3 | 0.1 | 0.06 | 0.14 | 43 |
| Comparative Example | 3 | Present | Absent | 0.8 | 0.2 | 0.04 | 0.10 | 48 |
| Comparative Example | 4 | Present | Absent | 1.0 | 0.1 | 0.04 | 0.09 | 49 |
| Example | 5 | Present | Absent | 5.0 | 0.8 | 0.04 | 0.07 | 118 |
| Example | 6 | Present | Absent | 7.5 | 1.5 | 0.03 | 0.06 | 126 |
| Example | 7 | Present | Absent | 10.3 | 2.1 | 0.05 | 0.16 | 103 |
| Example | 8 | Present | Absent | 15.4 | 4.3 | 0.04 | 0.11 | 110 |
| Example | 9 | Present | Absent | 19.5 | 6.0 | 0.04 | 0.09 | 117 |
| Example | 10 | Present | Absent | 20.0 | 5.8 | 0.03 | 0.10 | 107 |
| Comparative Example | 11 | Present | Absent | 20.0 | 6.2 | 0.10 | 0.11 | 49 |
| Comparative Example | 12 | Present | Absent | 21.2 | 6.0 | 0.04 | 0.09 | 79 |
| Comparative Example | 13 | Present | Absent | 26.0 | 7.3 | 0.04 | 0.09 | 66 |
| Comparative Example | 14 | Present | Absent | 2.0 | 10.1 | 0.13 | 0.17 | 42 |
| Comparative Example | 15 | Present | Absent | 7.5 | 1.5 | 0.06 | 0.08 | 89 |
| Example | 16 | Present | Absent | 7.5 | 1.5 | 0.05 | 0.04 | 122 |
| Example | 17 | Present | Absent | 7.5 | 1.5 | 0.04 | 0.03 | 139 |
| Example | 18 | Present | Absent | 7.5 | 1.5 | 0.03 | 0.11 | 101 |
| Comparative Example | 19 | Present | Absent | 7.5 | 1.5 | 0.07 | 0.09 | 83 |
| Comparative Example | 20 | Present | Absent | 1.0 | 0.2 | 0.08 | 0.13 | 78 |
| Example | 21 | Present | Absent | 1.0 | 0.2 | 0.04 | 0.12 | 97 |
| Comparative Example | 22 | Present | Absent | 20.0 | 5.8 | 0.06 | 0.10 | 81 |
| Comparative Example | 23 | Present | Absent | 20.0 | 5.8 | 0.06 | 0.12 | 73 |

Among the samples of Sample Nos. 1 to 23 shown in Table 1, Sample Nos. 1, 2, 3, 4, 11, 12, 13, 14, 15, 19, 20, 22, and 23 are Comparative Examples, and Sample Nos. 5 to 10, 16 to 18, and 21 are Examples.

In each of the inserts, the first surface, the second surface, and the third surface were blasted to remove the binder-phase-rich layer.

In the polishing with the brush, a polishing liquid obtained by mixing 0.1 μm to 3 μm diamond powder and a lubricating oil was applied to a hog hair brush, and the through hole, the chip breaker, and the cutting edge were polished while rotating the hog hair brush.

The thicknesses at the center portion and the end portions of the binder-phase-rich layer, the diameter R1 at the center portion, and the diameter R2 at the end portions were measured on a cross section obtained by cutting the base along a plane including the through-axis in the thickness-wise direction.

When the hardness of the interior of the base and the hardness of the binder-phase-rich layer were measured using a cross section of the insert, the hardness of the binder-phase-rich layer was lower than the hardness of the interior of the base.

The produced insert was placed in the pocket of the holder, the clamp was inserted into the through hole of the insert, and the insert was fixed with this clamp. A cutting test was then performed under the following conditions.

Cutting Test

Work material: SCr420

Cutting speed: 150 m/min

Feed: 0.15 mm/rev

Depth of Cut: 0.5 mm

Cutting state: Wet

Evaluation method: The cutting time until chipping occurred was evaluated.

In Sample Nos. 1, 2, 3, 4, 11, 12, 13, 14, 15, 19, 20, 22, and 23, which did not have the configuration of the insert of the present disclosure, the cutting time until chipping occurred was short and abnormal damage occurred. In the insert of the present disclosure, the insert was well held by the holder, and abnormal damage was suppressed. The cutting time until chipping occurred was long, and the surface roughness of the machined work material was also good.

From the above results, the surface roughness Ra of the chip breaker is preferably 0.05 μm or less. The surface roughness Ra of the cutting edge may be 0.1 μm or less, and more preferably 0.04 μm or less.

The cermet insert of the present disclosure and the cutting tool provided therewith described above are examples, and may have different configurations unless departing from the spirit of the present application.

The invention claimed is:

1. A cermet insert comprising a base which is a cermet including a hard particle and a binder phase, wherein
the cermet insert comprises:
a first surface;
a second surface;
a cutting edge located on at least a part of a ridge line between the first surface and the second surface;
a third surface located opposite to the first surface; and
a through hole extending from the first surface to the third surface,
an inner wall constituting the through hole comprises, at least in a center portion, a binder-phase-rich layer having a higher binder phase content than an interior of the base,
a first thickness of the binder-phase-rich layer at the center portion is larger than a second thickness of the binder-phase-rich layer at an end portion of the inner wall,
the first thickness is 1 μm or more and 20 μm or less,
the second thickness is 0.2 μm or more and 6 μm or less,
the first surface comprises a chip breaker, and
an arithmetic mean roughness of the chip breaker is 0.05 μm or less when a cut-off value is 0.08 mm.

2. The cermet insert according to claim 1, wherein
the cutting edge comprises a fourth surface continuous with the first surface and the second surface, and
an arithmetic mean roughness of the fourth surface is 0.1 μm or less when the cut-off value is 0.08 mm.

3. The cermet insert according to claim 2, wherein
the arithmetic mean roughness of the fourth surface is 0.04 μm or less when the cut-off value is 0.08 mm.

4. The cermet insert according to claim 1, wherein
a first diameter of the through hole at the center portion is larger than a second diameter of the through hole at the end portion.

5. The cermet insert according to claim 4, wherein
the first diameter is larger than the second diameter by 5 μm or more and 30 μm or less.

6. The cermet insert according to claim 1, wherein
a hardness of the binder-phase-rich layer at the center portion is 10 GPa or more and 20 GPa or less.

7. The cermet insert according to claim 1, wherein
the binder-phase-rich layer at the center portion comprises a metal layer having a higher binder phase content than the binder-phase-rich layer on a through-axis side of the through hole.

8. The cermet insert according to claim 1, further comprising a coating layer on the binder-phase-rich layer in the center portion, wherein
the coating layer comprises a portion having a higher hardness than the binder-phase-rich layer.

9. A cutting tool, comprising:
a holder having a length extending from a first end to a second end and comprising a pocket located on a first end side;
a cermet insert located in the pocket, the cermet insert including a base which is a cermet including a hard particle and a binder phase, wherein
the cermet insert includes:
a first surface;
a second surface;
a cutting edge located on at least a part of a ridge line between the first surface and the second surface;
a third surface located opposite to the first surface; and
a through hole extending from the first surface to the third surface,
an inner wall constituting the through hole comprises, at least in a center portion, a binder-phase-rich layer having a higher binder phase content than an interior of the base,
a first thickness of the binder-phase-rich layer at the center portion is larger than a second thickness of the binder-phase-rich layer at an end portion of the inner wall,
the first thickness is 1 μm or more and 20 μm or less,
the second thickness is 0.2 μm or more and 6 μm or less,
the first surface comprises a chip breaker, and
an arithmetic mean roughness of the chip breaker is 0.05 μm or less when a cut-off value is 0.08 mm; and
a clamp inserted into the through hole of the cermet insert.

* * * * *